United States Patent [19]
Wallace

[11] 4,220,575
[45] Sep. 2, 1980

[54] AQUEOUS LOW GLOSS PIGMENTED COATING COMPOSITIONS CONTAINING CAPROLACTONE-POLYOL ADDUCTS

[75] Inventor: David R. Wallace, Pittsburgh, Pa.
[73] Assignee: PPG Industries, Inc., Pittsburgh, Pa.
[21] Appl. No.: 940,044
[22] Filed: Sep. 6, 1978
[51] Int. Cl.$^2$ .................... C08L 61/10; C08L 61/28
[52] U.S. Cl. ..................... 260/29.3; 428/460; 260/29.4 UA; 525/143; 525/162; 525/163; 525/221
[58] Field of Search ......... 260/29.3, 29.4 R, 29.4 UA, 260/851, 856, 844; 525/143, 163, 221

[56] References Cited

U.S. PATENT DOCUMENTS

| | | | |
|---|---|---|---|
| 3,839,253 | 10/1974 | Kershaw et al. | 260/29.6 R |
| 3,928,272 | 12/1975 | Brancato et al. | 260/29.4 R |
| 3,943,080 | 3/1976 | Wismer et al. | 260/29.3 |
| 4,137,205 | 1/1979 | Berenschot et al. | 260/29.4 UA |

*Primary Examiner*—Theodore E. Pertilla
*Attorney, Agent, or Firm*—Charles R. Wilson

[57] ABSTRACT

Aqueous coating compositions consist essentially of: (a) a water-insoluble film-forming polymeric resin; (b) water-insoluble agglomerated particulate beads of urea, melamine or phenol and formaldehyde; (c) caprolactone-polyol adducts having a weight average molecular weight of from about 250 to about 2500; (d) pigments; and (e) water. The aqueous coating compositions are especially useful for imparting to metal coil a low gloss pigmented protective finish having good metal marking resistance.

15 Claims, No Drawings

AQUEOUS LOW GLOSS PIGMENTED COATING COMPOSITIONS CONTAINING CAPROLACTONE-POLYOL ADDUCTS

BACKGROUND OF THE INVENTION

The subject invention relates to aqueous coating compositions. More particularly, it relates to aqueous coating compositions capable of giving a low gloss pigmented protective finish to metal coil.

Metal coil coating compositions based on polymeric film-forming materials are well known. Such compositions typically contain a film-forming material for providing a protective finish, flatting agents for imparting a desired degree of gloss and pigments. Most prior art compositions formulated for use on metal coil have been organic solvent based. However, in recent years there has been a desire to reduce or eliminate the content of organic solvents in coating compositions. Part of the reason for this has been because of the high cost of the organic solvent itself, as well as the high cost of equipment needed to remove the organic solvent from the surrounding atmosphere following a coating operation.

There is a need for aqueous coating compositions capable of giving the same set of desired properties as an organic solvent based composition. One particular problem encountered with aqueous coating compositions in the field of metal coil coating has been metal marking. Metal marking is the undesired phenomenon observed during fabrication of coated metal coils. The intentional or accidental sliding of one coated metal coil over another coated metal coil (for example, during the installation of aluminum siding on a house) oftentimes will leave a dark mark which is difficult to remove. Metal coil coated with organic solvent based coating compositions have not been hampered with a metal marking problem; this is because of the fact the polymeric film formers used are capable of adequately protecting the metal coil. Metal marking has been observed to be much more acute with aqueous coating compositions, and in particular with latex coating compositions. It is believed the metal marking results from conventional flatting agents and pigments typically included in the coating compositions. Because of the way a latex film is formed, the pigment particles and flatting agents protrude through the surface of the formed film and, in effect, act as abradants. Films formed from organic solvent based compositions appear to form in such a manner that the pigments and flatting agents are buried within the film and do not protrude through the surface, thereby lessening the tendency of metal marking.

Various attempts have been made to eliminate or reduce the metal marking resistance observed with aqueous coating compositions used on metal coil. Attempts at reducing the pigment particle size, as well as using less hard flatting agents, have not been fully successful.

There have now been found aqueous coating compositions containing film former, flatting agent and pigment, which are capable of providing a protective finish to metal coil without the problem of metal marking.

As used herein, all percentages and ratios are by weight unless otherwise indicated.

SUMMARY OF THE INVENTION

Aqueous coating compositions useful for imparting to metal coil a low gloss pigmented protective finish having good metal marking resistance consist essentially of:

(a) from about 10 percent to about 50 percent of a water insoluble film-forming polymeric resin;

(b) from about 0.5 percent to about 7 percent of flatting agent, said agent being water-insoluble agglomerated particulate beads having a gross particle diameter of from 1 micron to about 60 microns, wherein said beads consist essentially of the reaction product of urea, melamine or phenol and formaldehyde having a molar ratio of the urea to the formaldehyde of from about 1:1 to about 6:1, a molar ratio of the melamine to the formaldehyde of from about 1:1 to about 1:4, and a molar ratio of the phenol to the formaldehyde of from about 1:1 to about 1:3;

(c) from about 0.5 percent to about 7 percent of a caprolactone-polyol adduct having a weight average molecular weight of from about 250 to about 2500;

(d) from about 5 percent to about 40 percent of pigment; and (e) the balance water.

DETAILED DESCRIPTION OF THE INVENTION

The aqueous coating compositions described herein consist essentially of film-forming polymeric resins, flatting agents, caprolactone-polyol adducts, pigments and water. Each of the components is described in the following paragraphs.

Many different water-insoluble polymeric film-forming materials which are capable of forming a dispersion in water are useful here. The aqueous coating compositions consist essentially of from about 10 percent to about 50 percent, preferably from about 20 percent to about 35 percent, of the film-forming polymeric resin. Specific examples of the polymeric film-forming materials are acrylic resins, vinyl resins and mixtures thereof, as described more fully in the following paragraphs.

Useful film-forming polymeric resins are the acrylic resins which are the polymerized ester derivatives of acrylic acid and methacrylic acid. The resins contain the units

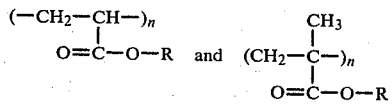

The esters are formed by the reaction of acrylic or methacrylic acid with suitable alcohols, e.g., methyl alcohol, ethyl alcohol, propyl alcohol, butyl alcohol and 2-ethylhexyl alcohol. Generally speaking, the larger the alcoholic portion of the ester, the softer or more flexible the resultant resin. Also generally speaking, the methacrylic esters form harder films than the corresponding acrylic esters. Monomers such as styrene, vinyl toluene, vinyl chloride and vinylidene chloride can be reacted with the acrylic and methacrylic esters so as to produce resins with excellent properties.

Thermosetting acrylic resins are normally low molecular weight copolymers made from two and sometimes three monomers. One of the monomers is an acrylic compound containing pendent reactive groups such as carboxyl, hydroxyl or amide. Another is an acrylic ester. The third monomer is usually a styrene-type monomer such as styrene itself, vinyl toluene, or alpha-methylstyrene. The proportions of the three components in the polymerization procedure are varied, depending on the products in which the copolymer will be used.

Many different copolymers of the aforedescribed monomers can be made. For example, copolymers of acrylic resins with each other or with other monomers of acrylic or methacrylic acid and their derivates such as methyl acrylate, methyl methacrylate, ethyl acrylate, ethyl methacrylate, butyl acrylate, butyl methacrylate, acrylamide and acrylonitrile are useful.

Other useful film-forming polymeric resins include the vinyl resins derived from monomers containing a carbon-to-carbon double bond.

These monomers polymerize by linear addition to form long-chain molecules. Generally, the polymeric resins have the structure:

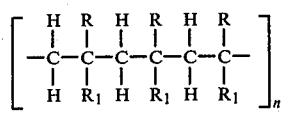

where R and $R_1$ represent various pendent groups such as hydrogen, chlorine, acetate and aromatic groups. The vinyl resins are commonly derived from the monomers vinyl chloride, vinylidene chloride, vinyl acetate, styrene, acrylonitrile and mixtures thereof.

Copolymers derived from mixtures of any of the aforedescribed vinyl monomers, either with themselves or with other commonly used polymerizable monomers, are used herein. Such copolymers possess a wide range of properties and can be formulated to fit individual needs.

The water-insoluble polymeric resins have a particle diameter of less than about 1 micron, preferably from about 0.05 microns to about 0.5 microns, and are suspended in water. Such compositions are oftentimes referred to as emulsions or latices. Conventional methods are used to form a stable suspension.

Another component of the aqueous coating compositions is a flatting agent in an amount ranging from about 0.5 percent to about 7 percent, preferably from about 1 percent to about 4 percent. The flatting agents used are water-insoluble, agglomerated particulate beads having a gross particle diameter of from about 1 micron to about 60 microns, preferably from about 5 microns to about 35 microns. The beads consist essentially of the reaction product of the urea, melamine or phenol and formaldehyde. The molar ratio of the urea to the formaldehyde is from about 1:1 to about 6:1, preferably from about 2:1 to about 4:1. The molar ratio of the melamine to the formaldehyde is from about 1:1 to about 1:4, preferably from about 1:2 to about 1:3. The molar ratio of the phenol to the formaldehyde is from about 1:1 to about 1:3, preferably from about 1:2 to about 1:3.

The agglomerate particulate beads are available commercially. Alternatively, the beads based on the urea or phenol and formaldehyde can be prepared by the method described in U.S. Pat. No. 3,943,080, issued Mar. 9, 1976 to Marco Wismer, Karl F. Schimmel and Rodger G. Temple, the disclosure of which is herein incorporated by reference. Thus, the particulate beads can be prepared by acidifying, while under agitation, an aqueous mixture of urea or phenol and formaldehyde in the presence of a protective colloid-forming material. The mixture is then polymerized so that particulate beads are formed in the presence of the protective colloid while the mixture is under agitation. The particulate beads are then agglomerated to the desired gross particle size, collected and, if desired, dried. Other suitable methods of making the particulate beads can be used.

It has been found that the aforedescribed level of particulate beads and gross particle size are necessary in order to get the desired degree of flatting. Thus, a level of particulate beads below about 0.5 percent does not give a noticeable flatting effect, while a level above 7 percent does not give increased flatting effects and is for this reason avoided. The particle size of the particulate beads above mentioned is also necessary in order to get a resultant film having the desired physical characteristics. Thus, a particulate bead diameter of greater than about 60 microns is avoided because of the adverse affect it has on the film's integrity.

The aqueous coating compositions also consist essentially of from about 0.5 percent to about 7 percent, preferably from about 1 percent to about 3 percent, of a caprolactone-polyol adduct. The adduct is made from the reaction of epsilon-caprolactone and a polyol. Suitable polyols are the diols, triols and tetraols. Examples include ethylene glycol, 1,2- and 1,3-propylene glycol, 1,3-, 1,4-, and 2,3-butylene glycol, 1,5-pentane diol, 1,8-octane diol, diethylene glycol, dibutylene glycol, neopentyl glycol, pentaerythritol, 1,1,1-trimethylolpropane and 1,1,1-trimethylolethane. Preferred polyols are diethylene glycol and trimethylolpropane. The molar ratio of the caprolactone to the polyol ranges from about 1:1 to about 25:1, preferably from about 3:1 to about 8:1. The caprolactone-polyol adducts are commercially available.

A weight average molecular weight range of the caprolactone-polyol adduct of from about 250 to about 2500 is used. A preferred weight average molecular weight range for the adduct is from about 250 to about 700. It has been found the addition of the caprolactone-polyol adduct to the aqueous coating compositions has a very beneficial effect on the metal marking resistance of the resultant metal coated coil. In the absence of the inclusion of such an adduct in the composition, the metal marking resistance is unsatisfactory. It is theorized the low molecular weight adduct migrates to the surface of the coating during baking and forms a cross-linked polymer network which prevents the abrasive pigment from showing at the surface and causing the metal marking. Particularly important is the fact the adduct has a low molecular weight within the range above indicated. Caprolactone-polyol adducts of a higher molecular weight do not possess the ability of improving the metal marking resistance of the coated metal coils.

Pigments are included in the aqueous coating compositions at a level ranging from about 5 percent to about 40 percent, preferably from about 15 percent to about 25 percent. Pigments useful herein include those conventionally used in the coatings industry. Examples of suitable pigments include the iron oxides, lead chromates, china clay, calcium carbonate, silica, zinc oxide, titanium dioxide, chrome green, chrome yellow, phthalo-green, phthalo-blue, cobalt blue, cadmium yellow, cadmium red and carbon black.

The balance of the composition is water. Optionally, a minor amount of an organic solvent can be included in the composition. The amount of organic solvent included in the composition comprises less than about 10 percent, preferably less than about 5 percent of the composition. Suitable organic solvents include aromatic and aliphatic hydrocarbons; glycols, e.g., ethylene glycol and propylene glycol; glycol ethers, e.g., ethylene glycol monoethyl ether, ethylene glycol monobutyl ether and diethylene glycol monobutyl ether; ketones, e.g., methyl ethyl ketone; and alcohols, e.g., ethanol, propanol and butanol.

Various other additives commonly used in coating compositions can be used herein also. Such additives include plasticizers, surfactants, defoamers, lubricants, levelling agents, and stabilizers.

The aqueous coating compositions are especially useful for coating metal coil, such as aluminum siding. The resultant coatings are durable and are resistant to metal marking. The compositions can also be applied to other substrates, such as wood, glass, plastics and wallboard. The manner of coating is not important. Suitable methods include spraying, brushing, dipping, flow coating and roll coating.

The examples which follow are illustrative of the invention.

EXAMPLE I

This example illustrates the increased metal marking resistance obtained when a urea/formaldehyde flatting agent and a caprolactone-polyol adduct is used versus when a conventional silica flatting agent and a caprolactone-polyol adduct is used in a coating composition.

A pigment paste for use in the compositions of this example is made by blending the following materials:

|  | % |
|---|---|
| Acrylic resin[1] | 4.6 |
| Dimethylethanolamine | 0.6 |
| Melamine resin[2] | 7.3 |
| Titanium dioxide | 68.9 |
| Ethylene glycol monoethyl ether | 3.3 |
| Ethylene glycol | 12.2 |
| Diethylene glycol monobutyl ether | 3.1 |

[1]A water-insoluble resin made from an 80:10:10 ratio of isobutyl methacrylate, hydroxyethyl acrylate and acrylic acid.
[2]Available from American Cyanamid as Cymel 303.

The above components are blended on a Cowles mixer for about 20 minutes to form a uniform pigment paste. Next, coating compositions are made using the pigment paste by blending the following components:

|  | % | |
|---|---|---|
|  | A | B |
| Pigment paste | 38.7 | 38.7 |
| Acrylic emulsion (3) | 55.0 | 55.0 |
| Defoamer (4) | 0.3 | 0.3 |
| Caprolactone-polyol adduct (5) | 2.0 | 2.0 |
| Urea/formaldehyde (2:1, average particle diameter of 8 microns) | 4.0 | — |
| Silica (average particle diameter of 7 mirons) | — | 4.0 |

[3]The emulsion comprises 45 percent solids in water of an acrylic polymer of butyl acrylate, methyl methacrylate, hydroxypropyl methacrylate and acrylic acid, 47:47:4:2.
[4]Available from Balab Chem. Co. as Bubble Breaker #3056-A.
[5]Available from Union Carbide Corp. as PCP-0300. The compound is derived from epsilon-caprolactone and trimethylolpropane and has a molecular weight of 540.

Metal panels are separately coated with each of the compositions and baked to a peak metal temperature of 215° C. at a dwell time of 1 minute or less. Each composition provides a low gloss durable finish of about 0.8 mils thickness. The metal marking resistance of the panels is tested by rubbing a coin over each of the coated surfaces. The metal marking resistance of the panel coated with Composition A is satisfactory. However, the metal marking resistance of the panel coated with Composition B is unsatisfactory as evidenced by a dark, permanent streak where the coin has been rubbed.

EXAMPLE II

Coating compositions are formulated in the manner of Example I. Caprolactone-polyol adducts of different molecular weights are used to show the effect they have on the metal marking resistance imparted to metal coil.

|  | A | B | C | D | E |
|---|---|---|---|---|---|
| Pigment paste[1] | 38.7 | 38.7 | 38.7 | 38.7 | 38.7 |
| Acrylic emulsion[2] | 57.0 | 55.0 | 55.0 | 55.0 | 55.0 |
| Defoamer[3] | 0.3 | 0.3 | 0.3 | 0.3 | 0.3 |
| Caprolactone-polyol adduct[4] | — | 2.0 | — | — | — |
| Caprolactone-polyol adduct[5] | — | — | 2.0 | — | — |
| Caprolactone-polyol adduct[6] | — | — | — | 2.0 | — |
| Caprolactone-polyol adduct[7] | — | — | — | — | 2.0 |
| Urea/formaldehyde (2:1, average particle diameter of 8 microns) | 4.0 | 4.0 | 4.0 | 4.0 | 4.0 |

[1]Same pigment paste used in Example I
[2]Same acrylic emulsion used in Example I
[3]Same defoamer used Example I
[4]Available as PCP-0240 from Union Carbide Corp. The compound is derived from epsilon-caprolactone and diethylene glycol and has a molecular weight of 2000.
[5]Available as PCP-0300 from Union Carbide Corp. The compound is derived from epsilon-caprolactone and trimethylolpropane and has a molecular weight of 540.
[6]Available from Union Carbide Corp. as PCP-0200. The compound is derived from epsilon-caprolactone and diethylene glycol and has a molecular weight of 530.
[7]Available from Union Carbide Corp. as PCP-0260. The compound is derived from epsilon-caprolactone and diethylene glycol and has a molecular weight of 3000.

Each of the compositions is separately applied to metal panels and evaluated for metal marking resistance in the manner given in Example I. Values ranging from 0 (no metal marking) to 10 (very dark streak) with 3 being marginably acceptable are assigned as follows:

| Composition | Metal Marking Resistance |
|---|---|
| A | 6 |
| B | 3 |
| C | 0 |
| D | 1 |
| E | 5 |

Compositions of this invention, (Compositions B, C and D) all give acceptable metal marking resistance while the control (Composition A) and a composition containing a caprolactone-polyol adduct having a molecular weight above 2500 (Composition E) give unacceptable metal marking resistance.

The above examples are illustrative of the coating compositions of the invention. The compositions all impart low gloss, pigmented, durable finishes to substrates. The coated substrates possess good metal marking resistance.

What is claimed is:

1. An aqueous coating composition useful for imparting to metal coil a low gloss pigmented protective finish having good metal marking resistance, said composition consisting essentially of:
   (a) from about 10 percent to about 50 percent of a water-insoluble film-forming acrylic resin, vinyl resin or mixture thereof;
   (b) from about 0.5 percent to about 7 percent of flatting agent, said agent being water-insoluble agglomerated particulate beads having a gross particle diameter of from about 1 micron to about 60 microns, wherein said beads consist essentially of the reaction product of urea, melamine or phenol and formaldehyde having a molar ratio of the urea to the formaldehyde of from about 1:1 to about 6:1, a molar ratio of the melamine to the formaldehyde of from about 1:1 to about 1:4, and a molar ratio of the phenol to the formaldehyde of from about 1:1 to about 1:3;
   (c) from about 0.5 percent to about 7 percent of a caprolactone-polyol adduct having a weight average molecular weight of from about 250 to about 2500;
   (d) from about 5 percent to about 40 percent of pigment; and
   (e) the balance water.

2. The aqueous coating composition of claim 1, wherein the film-forming resin is an acrylic resin having a particle diameter of less than about 1 micron.

3. The aqueous coating composition of claim 2 wherein the caprolactone-polyol adduct is the reaction product of a epsilon-caprolactone and a diol.

4. The aqueous coating composition of claim 3, wherein the diol is diethylene glycol.

5. The aqueous coating composition of claim 2, wherein the caprolactone-polyol adduct is the reaction product of epsilon-caprolactone and a triol.

6. The aqueous coating composition of claim 5, wherein the triol is trimethylolpropane.

7. The aqueous coating composition of claims 3 or 5, wherein the adduct has a weight average molecular weight of from about 250 to about 700.

8. The aqueous coating composition of claim 1, wherein the flatting agent is the reaction product of urea and formaldehyde.

9. The aqueous coating composition of claim 8, wherein the molar ratio of the urea to the formaldehyde is from about 2:1 to about 4:1.

10. The aqueous coating composition of claim 1, wherein the flatting agent is the reaction product of melamine and formaldehyde.

11. The aqueous coating composition of claim 11, wherein the molar ratio of the melamine to the formaldehyde is from about 1:2 to about 1:3.

12. The aqueous coating composition of claim 1, wherein the flatting agent is the reaction product of phenol and formaldehyde.

13. The aqueous coating composition of claim 12 wherein the molar ratio of the phenol to the formaldehyde is from about 1:2 to about 1:3.

14. The aqueous coating composition of claims 8, 10 or 12 wherein the gross particle diameter of the beads is from about 5 microns to about 35 microns.

15. The aqueous coating composition of claim 2 consisting essentially of:
   (a) from about 20 percent to about 35 percent of the film-forming resin;
   (b) from about 1 percent to about 4 percent of the flatting agent;
   (c) from about 1 percent to about 3 percent of the caprolactone-polyol adduct;
   (d) from about 15 percent to about 25 percent of the pigment; and
   (e) the balance water.

* * * * *